United States Patent
Alasti et al.

(10) Patent No.: US 12,446,059 B2
(45) Date of Patent: Oct. 14, 2025

(54) MANAGING INTERFERENCE FOR WIRELESS DEVICES IN A NON-TERRESTRIAL NETWORK ENVIRONMENT

(71) Applicant: DISH WIRELESS L.L.C., Englewood, CO (US)

(72) Inventors: Mehdi Alasti, Reston, VA (US); David Zufall, Lone Tree, CO (US); Jingyi Zhou, Belle Mead, NJ (US); Siddhartha Chenumolu, Broadlands, VA (US)

(73) Assignee: DISH Wireless L.L.C., Englewood, CO (US)

( * ) Notice: Subject to any disclaimer, the term of this patent is extended or adjusted under 35 U.S.C. 154(b) by 416 days.

(21) Appl. No.: 17/992,706

(22) Filed: Nov. 22, 2022

(65) Prior Publication Data

US 2024/0172261 A1    May 23, 2024

(51) Int. Cl.
*H04W 72/54* (2023.01)
(52) U.S. Cl.
CPC ................................. *H04W 72/54* (2023.01)
(58) Field of Classification Search
CPC .. H04M 1/0214; H04M 1/026; H04M 1/0262; H04M 1/035; H04M 1/02; H04M 1/03; H04B 1/0475; H04B 1/525; H04B 1/04; H04B 7/18513; H04B 7/185; H03F 1/3288; H03F 3/19; H03F 3/245; H04W 16/14; H04W 72/0453; H04W 72/54; H04W 84/06
USPC ....................................................... 455/452.1
See application file for complete search history.

(56) References Cited

U.S. PATENT DOCUMENTS

| | | | |
|---|---|---|---|
| 6,400,927 B1 * | 6/2002 | Daniel | H04B 7/18513 455/430 |
| 10,848,237 B1 | 11/2020 | Sorond et al. | |
| 12,262,252 B2 * | 3/2025 | Kim | H04W 36/0079 |

(Continued)

FOREIGN PATENT DOCUMENTS

| | | |
|---|---|---|
| WO | 01/17133 A1 | 3/2001 |
| WO | 2009/056390 A2 | 5/2009 |

(Continued)

OTHER PUBLICATIONS

International Search Report and Written Opinion received for PCT Patent Application No. PCT/US2023/036621, mailed on Feb. 9, 2024, 11 pages.

*Primary Examiner* — Nathan S Taylor
(74) *Attorney, Agent, or Firm* — Jeremiah J. Baunach; Frontier IP Law PLLC

(57) ABSTRACT

An example system and method may manage interference for wireless devices in a non-terrestrial network environment. An example system may determine spectrum blanking ranges for a wireless client device, where the spectrum blanking range restricts wireless frequencies in the spectrum blanking range from being assigned to wireless client devices by ground node. The system may determine a signal quality indicator value for a wireless client device, determine an assignable spectrum range for the wireless client device based on the signal quality indicator value and the spectrum blanking range(s), and assign a channel to the wireless client device using the assignable spectrum range.

12 Claims, 11 Drawing Sheets

(56) References Cited

U.S. PATENT DOCUMENTS

| | | | |
|---|---|---|---|
| 2010/0272038 A1* | 10/2010 | Hamalainen | H04W 16/14 |
| | | | 370/329 |
| 2021/0036769 A1* | 2/2021 | Sorond | H04B 7/2615 |
| 2022/0394488 A1* | 12/2022 | Navarro | H04W 16/10 |
| 2023/0156844 A1* | 5/2023 | Chen | H04W 36/0079 |
| | | | 455/436 |
| 2024/0121848 A1* | 4/2024 | Chen | H04W 76/19 |
| 2025/0048202 A1* | 2/2025 | Ramachandra | H04W 36/08 |

FOREIGN PATENT DOCUMENTS

| | | | | |
|---|---|---|---|---|
| WO | 2021/078399 A1 | 4/2021 | | |
| WO | WO-2022212424 A1 * | 10/2022 | | H04B 7/0695 |

* cited by examiner

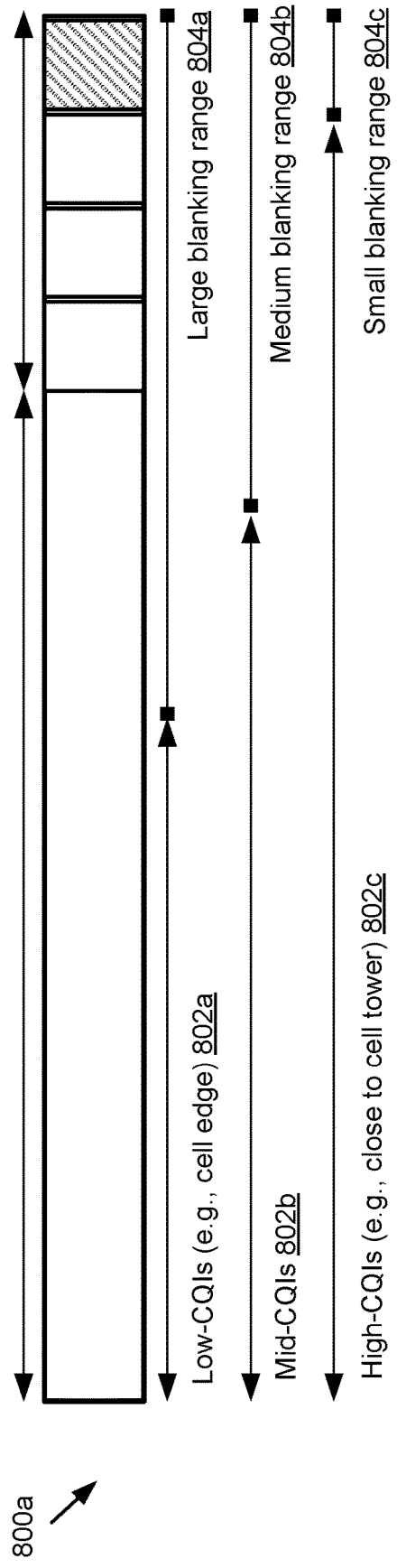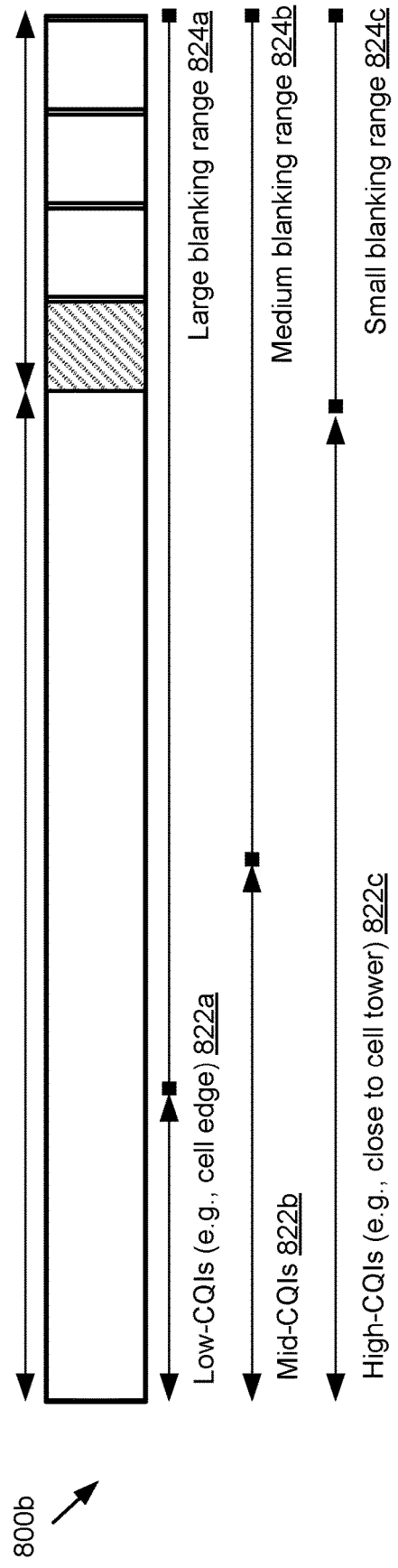

MANAGING INTERFERENCE FOR WIRELESS DEVICES IN A NON-TERRESTRIAL NETWORK ENVIRONMENT

TECHNICAL FIELD

The present disclosure relates to a system for reducing wireless interference for wireless electronic devices, such as mobile devices. Some implementations relate to an adaptable system for reducing interference between various devices in a wireless communications environment in which both terrestrial and non-terrestrial networks are present.

BRIEF SUMMARY

Wireless client devices, such as mobile devices, communicate via a spectrum of various electromagnetic (also referred to as radio herein for simplicity, although it should be noted that microwave or other frequencies may be used) frequencies in which a wireless cellular provider has access to a certain spectrum of usable frequencies that allow communication between the wireless client devices and a network of other devices, for example, provided using servers, cellular towers, and other equipment. For instance, a wireless client device in a cell or area served by a terrestrial cellular tower may be assigned a channel or set of frequencies by the cellular tower for communication with the cellular tower, which relays communications from the wireless client device using the assigned channel.

Non-terrestrial network providers may allow wireless client devices, such as mobile devices, to communicate via satellites, thereby increasing the geographic areas in which the devices can communicate. Satellites may provide communication with cellular (e.g., non-satellite phones) devices using radio frequencies typically reserved for terrestrial cellular networks. This technology allows mobile devices to send messages, such as short messaging service (SMS) text messages, using their built in cellular radios even while located in remote geographic regions that would be out of a coverage area of cellular towers.

Unfortunately, where multiple antennas (e.g., a terrestrial cellular antenna and a non-terrestrial satellite-based antenna) serve the same geographic area using the same, similar, or adjacent frequencies, in band or out-of-band radio interference can cause issues with the wireless communications and reliability of the network(s). Addressing these issues is further complicated by satellites serving larger geographic regions than cellular towers resulting in potentially many more cellular towers serving the same regions. Accordingly, the relative network environments including signal strengths experienced and used by wireless communications devices can vary wildly within the same region.

Interference can be caused by a number of different factors. A first mobile device attempting to communicate with a satellite could interfere with a second, nearby mobile device, for example, because mobile, cellular devices typically have omni directional antennas. Similarly, transmissions from a cellular tower may interfere with a satellite (whether transmissions or receptions), a satellite's transmissions may interfere with a cellular tower (whether transmissions or receptions) for in-band or out-of-band (e.g., band-adjacent) frequencies. Because cellular hardware (e.g., a cellular tower/antenna) may be directional and because distances and various other factors vary based on elevation and distance (e.g., due to signal attenuation or broadcast power), the technology herein may also take these interference factors into consideration in the presented solutions.

Because electromatic frequency spectrum is very limited and expensive, it is desirable to maximize usefulness of available spectrum while reducing interference. Unfortunately, because bandpass filters and radio frequency leakage typically do not allow perfect alignment of channels, system intelligence is desirable in addressing interference while maximizing spectrum efficiency. The technologies described herein intelligently mitigate interference in varying contexts while also allowing the wireless networks to coexist in the same or adjacent spectrum frequencies.

While networks typically attempt to maximize the amount of spectrum assignable to wireless client devices to reduce interference, the technologies described herein may reduce interference by reducing assignable wireless spectrum/frequencies, such as by establishing static or dynamic spectrum (e.g., physical resource block or "PRB") blanking ranges. The technology may determine attributes of terrestrial and/or non-terrestrial hardware or signals and use the attributes to increase network utilization and coexistence while reducing interference. For example, the technology may vary spectrum blanking ranges based on wireless client device signal strength, spectrum blocks/bands used by satellites, elevation or distances between satellites and terrestrial cell hardware or ground nodes, and other factors. The technology uses the factors to adapt spectrum blanking ranges or otherwise assign channels to client devices in such a way that the spectrum is efficiently used while reducing interference and allowing coexistence of the terrestrial and non-terrestrial wireless networks. These and other features and operations are described in further detail throughout this disclosure.

The technology may include an improved wireless scheduler system, which may be configured to perform particular operations or actions by virtue of having software, firmware, hardware, or a combination of them installed on the system that in operation causes or cause the system to perform the actions. One general aspect of the system includes a method that includes: determining a channel quality information or indicator (also referred to herein as cellular or signal quality indicator) value for a wireless client device using one or more wireless signals; determining one or more spectrum blanking ranges for the wireless client device, the one or more spectrum blanking ranges restricting wireless frequencies in the one or more spectrum blanking ranges from being assigned to the wireless client device by cell hardware; determining an assignable spectrum range for the wireless client device based on the signal quality indicator value and the one or more spectrum blanking ranges; and assigning a channel to the wireless client device using the assignable spectrum range.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 8A and 8B illustrate example diagrams of a wireless spectrum used by wireless client devices along with example blanking ranges.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the implementations.

With reference to the figures, reference numbers may be used to refer to example components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1:
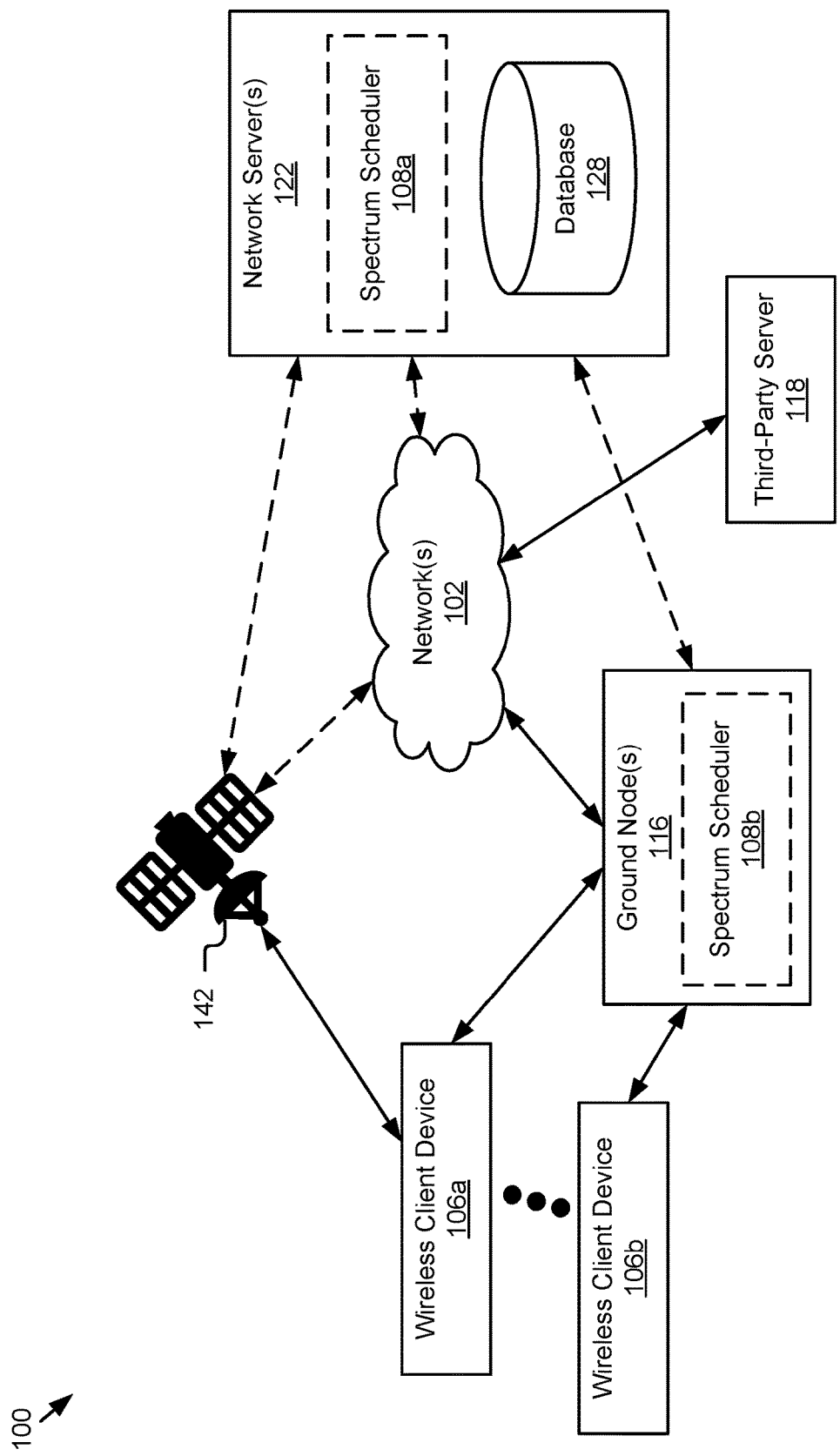
FIG. 1 is a block diagram of an example system for managing interference for wireless devices in a non-terrestrial network environment.

FIG. 1 is a block diagram of an example system 100 for managing interference for wireless devices in a non-terrestrial network environment and other features described throughout this disclosure. The illustrated example system 100 may include one or more wireless client device(s) 106a . . . 106b, ground node(s) 116, satellite(s) 142, a network server 122, and a third-party server 118 (although different configurations and quantities are possible), which may be electronically communicatively coupled via one or more networks 102 for interaction with one another, although other system configurations are possible including other devices, systems, and networks. Before providing additional details regarding the operation and constitution of methods and systems the technology herein, the example environment 100, within which such a system may operate, will briefly be described.

The ground node(s) 116 (e.g., gNB or Next Generation NodeB, or other cell hardware and/or software) may include one or more antennas, masts, amplifiers, broadcast systems, computing systems, filters, power supplies, and/or other devices at or serving one or more cell sites, which provide cellular communication via electromagnetic waves covering a certain geographic area or location, which may be referred to as a cell. For instance, the ground node(s) 116 may be or be part of a terrestrial cellular network provider. It should be noted that a certain cell may be served by a plurality of ground node 116 components, such as multiple antennas, towers, etc. It should also be noted that although the ground node(s) 116 may be fully or partially mounted in a tower or mast, this implementation is provided by way of example and other implementations are possible and contemplated herein. The ground node(s) 116 may include or be communicatively coupled with one or more computing devices or processors that provide instructions to the ground node(s) 116, as described below. For instance, the computing device may run an instance of, portion of, or may interact with a spectrum scheduler 108 that performs operations described herein. For instance, the ground node(s) 116 may, independently or in collaboration with a remote system, such as a network server 122, determine spectrum blanking ranges, assignable frequencies or channels, assign frequencies or channels, or perform other operations described herein. Although only a single instance of the ground node(s) 116 is illustrated, it should be noted that many instances of the ground node(s) 116 may be used to serve one or more terrestrial cells.

It should be noted that this description refers to a spectrum, frequencies, frequency ranges, bands, blocks, and/or channels. These entities may refer to a single electromagnetic frequency or a range of electromagnetic frequencies. For instance, a wireless spectrum may include a set of bands, physical resource blocks, and or channels, which correspond to one or more frequencies of the spectrum. The bands, ranges, spectra, etc., may additionally or alternatively be defined in terms of threshold frequencies between the bands or ranges.

In some implementations, the system 100 may include one or more satellites 142, which transmit wireless electromagnetic signals. The satellite(s) 142 may provide wireless communications with one or more wireless client devices 106, such as wireless client device 106a, as illustrated. Satellites 142 may be geostationary, in low earth orbit, or orbiting while still performing operations described herein. Where the satellites 142 are orbiting, they may alternate frequencies to use consistent bands in certain geographic regions or the spectrum scheduler 108 may adapt to the changing satellite 142 attributes in real or near real time. The satellite 142 and associated signals are described in further detail elsewhere herein.

The wireless client device(s) 106 (also referred to simply as client devices 106 herein) includes one or more computing devices having data processing and communication capabilities, which may, for instance, include a cellular radio. The client device 106 may couple to and communicate with other client devices 106 and the other entities of the system 100 via the network 102, satellite 142, and/or ground node(s) 116 using a wireless and/or wired connection, such as the network server 122. Examples of client devices 106 may include, but are not limited to, mobile phones, smart phones, wearables, tablets, laptops, desktops with cellular radios, netbooks, server appliances, servers, virtual machines, TVs, or other devices with wireless communication capabilities, etc. The system 100 may include any number of client devices 106, including client devices 106 of the same or different type. As noted elsewhere herein, a wireless client device 106 may transmit messages to a ground node(s) 116, satellite(s) 142, or, potentially, other devices, such as Wi-fi routers, etc. Ground node(s) 116 may, depending on the implementation, assign channels, frequencies, sets of frequencies, or frequency ranges to the wireless client devices 106 for communication. In some instances, the ground node(s) 116 and/or satellites 142 may assign channels or frequencies for communication by the wireless client devices 106 to the satellites 142.

For instance, a first client device 106*a* is illustrated as being communicatively linked with a satellite 142 and a ground node(s) 116. A second client device 106*b* is illustrated as being communicatively linked with a ground node(s) 116, which may be the same or different ground node 116. In some cases, as described elsewhere herein, the first client device 106*a*, the second client device 106*b*, the ground node(s) 116, and the satellite 142 may each receive and/or transmit wireless signals at one or more frequencies/frequency ranges. The signals from these devices may interfere with each other, as described elsewhere herein.

The spectrum scheduler 108 may include specifically designed hardware or computer logic executable by a processor to perform operations described herein. For example, the spectrum scheduler 108 may determine wireless spectrum blanking blocks, frequencies, or frequency ranges and may assign channels, frequencies, etc., for communication, as describe elsewhere herein. As illustrated, an instance of the spectrum scheduler 108*a* may be executed as a web application or backend process on the network server 122. An instance of the spectrum scheduler 108*b* may be executed on a ground node(s) 116 or an associated control or computing system. It should be noted that although several instances of the spectrum scheduler 108 are illustrated as being executed on various devices, the spectrum scheduler 108 represents a set of functionalities and may be a distributed system or a remotely hosted service that provides functionalities described herein. Similarly, where multiple spectrum schedulers 108 are used, they may be separate or distinct applications with varied logic or functionalities to perform the operations described herein.

There are a variety of systems, components, and network configurations that may also support distributed computing and/or cloud-computing environments within the communication system. For example, computing systems may be connected together within the network 102 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of network 102.

The network 102 may include any number of networks and/or network types. For example, the network 102 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The network server 122 may include a web server, an enterprise application, a spectrum scheduler 108, and/or a database 128. It should be noted that the network server 122 may represent multiple physical or virtual devices or servers. In some implementations, the network server 122 may receive data from a third-party server 118, such as location, geographic areas, cell areas, or a wireless network information for a satellite 142, ground node(s) 116, and/or client device 106. The network server 122 may execute a spectrum scheduler 108 to process data, determine spectrum blanking regions or blocks, assign frequencies or channels, or perform other operations described herein. For example, the network server 122 may be provided by a terrestrial wireless service provider and/or a non-terrestrial service provider.

The third-party server 118 may be a server or system, which provides data to a network server 122, spectrum scheduler 108, or other device. The third-party server 118 and network server 122 may part of the same system and/or company or may share data via various communication channels. For example, the spectrum scheduler 108 may receive or receive data from the third-party server 118, such as satellite 142 location, wireless client device 106 attributes (e.g., wireless radio specifications), wireless client device 106 locations, ground node(s) 116 locations or attributes, or other data, for example, for use in the computations described herein.

The network server 122 and the third-party server 118 have data processing, storing, and communication capabilities, as discussed elsewhere herein. For example, the servers 122 and/or 118 may include one or more hardware servers, server arrays, storage devices and/or systems, etc. In some implementations, the servers 122 and/or 118 may include one or more virtual servers, which operate in a host server environment.

The database 128 may be stored on one or more information sources for storing and providing access to data, such as the data storage device 208. The database 128 may store data describing client devices 106, satellites 142, ground node(s) 116, instances of the spectrum scheduler 108, available useable and/or guard spectrum bands, physical resource blocks, spectrum blanking ranges or blocks, channels, or other data, such as described herein.

It should be understood that the system 100 illustrated in FIG. 1 is representative of an example system and that a variety of different system environments and configurations are contemplated and are within the scope of the present disclosure. For instance, various acts and/or functionality may be moved from a server to a client (e.g., ground node(s) 116, client device 106, etc.), or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
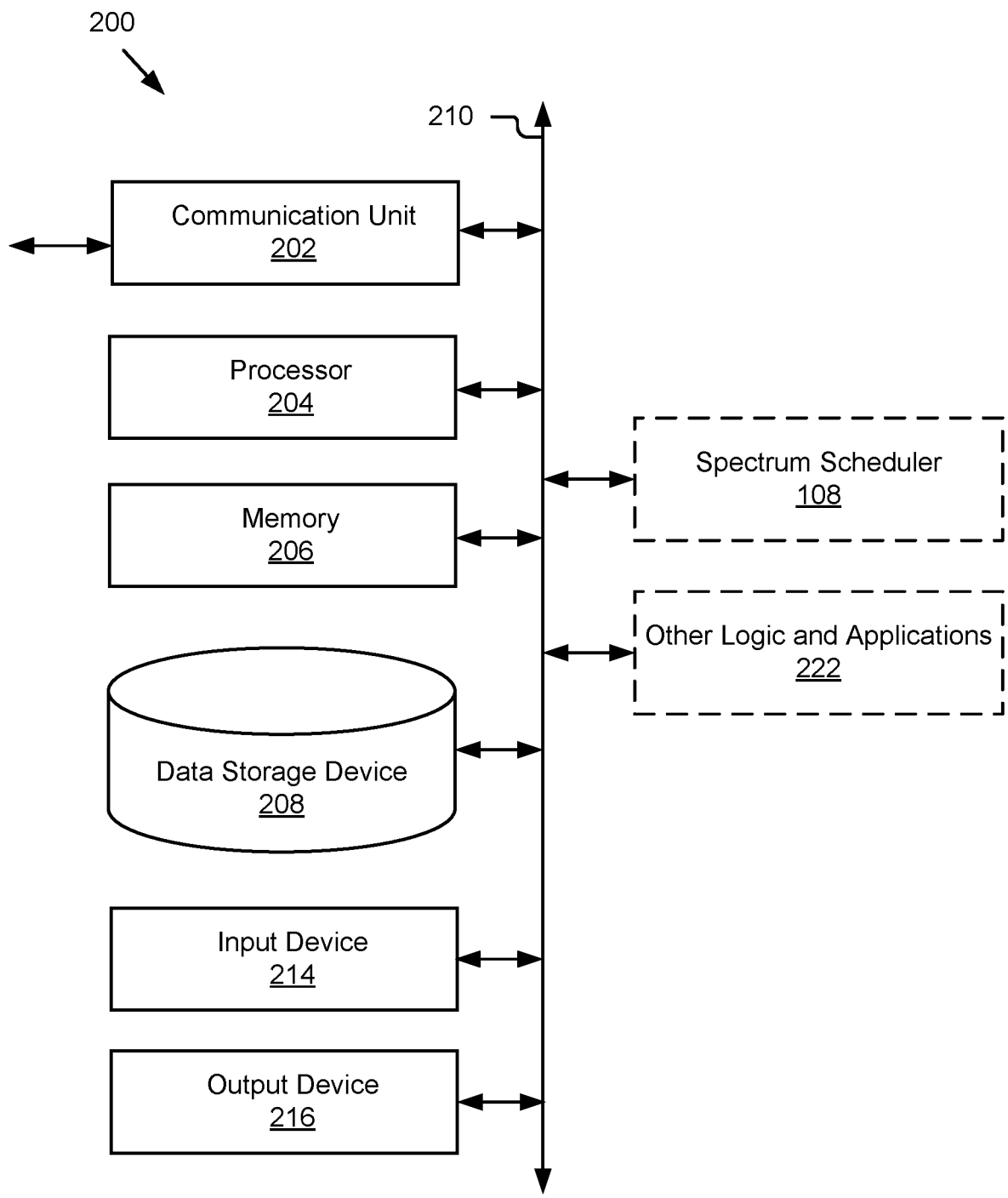
FIG. 2 is a block diagram of an example computing system including computer architecture.

FIG. 2 is a block diagram of an example computing system 200, which may represent the computer architecture of a client device 106, ground node(s) 116, third-party server 118, satellite 142, network server 122, and/or another device described herein, depending on the implementation. In some implementations, as depicted in FIG. 2, the computing system 200 may include a spectrum scheduler 108, or another logic and applications 222, depending on the configuration.

The spectrum scheduler 108 may include computer logic executable by the processor 204 on various entities of the system 100 via the network 102. In some implementations, the spectrum scheduler 108 or its components may be distributed on and/or provide instructions to various components of the system 100.

As depicted, the computing system 200 may include a processor 204, a memory 206, a communication unit 202, an output device 216, an input device 214, and a data storage device 208, which may be communicatively coupled by a communication bus 210. The computing system 200 depicted in FIG. 2 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 200 may include various operating systems, sensors, additional processors, and other physical configurations. The processor 204, memory 206, communication unit 202, etc., are representative of one or more of these components.

The processor 204 may execute software instructions by performing various input, logical, and/or mathematical operations. The processor 204 may have various computing architectures to method data signals (e.g., CISC, RISC, etc.). The processor 204 may be physical and/or virtual, and may include a single core or plurality of processing units and/or cores. In some implementations, the processor 204 may be coupled to the memory 206 via the bus 210 to access data and instructions therefrom and store data therein. The bus 210 may couple the processor 204 to the other components of the computing system 200 including, for example, the memory 206, the communication unit 202, the input device 214, the output device 216, and the data storage device 208.

The memory 206 may store and provide access to data to the other components of the computing system 200. The memory 206 may be included in a single computing device or a plurality of computing devices. In some implementations, the memory 206 may store instructions and/or data that may be executed by the processor 204. For example, the memory 206 may store one or more of the spectrum scheduler 108, the other logic and applications 222, and their respective components, depending on the configuration. The memory 206 is also capable of storing other instructions and data, including, for example, an operating system, hardware drivers, other software applications, databases, etc. The memory 206 may be coupled to the bus 210 for communication with the processor 204 and the other components of computing system 200.

The memory 206 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 204. In some implementations, the memory 206 may include one or more of volatile memory and non-volatile memory (e.g., RAM, ROM, hard disk, optical disk, etc.). It should be understood that the memory 206 may be a single device or may include multiple types of devices and configurations.

The bus 210 can include a communication bus for transferring data between components of a computing device or between computing devices, a network bus system including the network 102 or portions thereof, a processor mesh, a combination thereof, etc. In some implementations, the spectrum scheduler 108, other logic and applications 222, and various other components operating on the computing system/device 200 (operating systems, device drivers, etc.) may cooperate and communicate via a communication mechanism included in or implemented in association with the bus 210. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 202 may include one or more interface devices (I/F) for wired and wireless connectivity among the components of the system 100. For instance, the communication unit 202 may include, but is not limited to, various types known connectivity and interface options. The communication unit 202 may be coupled to the other components of the computing system 200 via the bus 210. The communication unit 202 can provide other connections to the network 102 and to other entities of the system 100 using various standard communication protocols.

In some implementations, the communication unit 202 may include one or more wireless communication devices, such as cellular radios, antennas, satellite 142 dishes, filters, etc., as described elsewhere herein. For instance, where the computing device 200 represents a cellular device, the communication unit 202 may include a cellular radio for communicating via 3G, 4G, LTE (long term evolution), 5G, 6G, etc. Where the computing device 200 represents ground node(s) 116, the communication unit 202 may include antennas or antenna arrays capable of communicating with one or many wireless devices or satellites 142 in a cell, geographic area, or transmission range. Similarly, where the computing device 200 represents a satellite 142, client device 106, network server 112, or other device, the communication unit 202 may include antennas, antenna arrays, satellite dishes, or other devices capable of communicating with one or many other devices of the system 100, in a cell, geographic region, or transmission range.

The input device 214 may include any device for inputting information into the computing system 200. In some implementations, the input device 214 may include one or more peripheral devices. For example, the input device 214 may include a keyboard, a pointing device, microphone, an image/video capture device (e.g., camera), a touch-screen display integrated with the output device 216, etc. The output device 216 may be any device capable of outputting information from the computing system 200. The output device 216 may include one or more of a display (LCD, OLED, etc.), a printer, a haptic device, audio reproduction device, touch-screen display, a remote computing device, etc. In some implementations, the output device is a display which may display electronic images and data output by a processor of the computing system 200 for presentation to a user, such as the processor 204 or another dedicated processor. In some implementations, the input device 214 may include an optical scanner or sensor, such as a camera that captures images, video, or other data.

The data storage device 208 may include one or more information sources for storing and providing access to data. In some implementations, the data storage device 208 may store data associated with a database management system (DBMS) operable on the computing system 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The data stored by the data storage device 208 may be organized and queried using various criteria including any type of data stored by them, such as in one or more databases (e.g., client device 106 attributes, ground node attributes, satellite 142 attributes, available spectrum, spectrum blanking ranges or blocks, available spectrum ranges, assignable or assigned channels, etc.), such as described herein. For example, the data storage device 208 may store the database 128. The data storage device 208 may include data tables, databases, or other organized collections of data. Examples of the types of data stored by the data storage device 208 may include, but are not limited to, the data described with respect to the figures, for example.

The data storage device 208 may be included in the computing system 200 or in another computing system and/or storage system distinct from but coupled to or accessible by the computing system 200. The data storage device 208 can include one or more non-transitory computer-readable mediums for storing the data. In some implementations, the data storage device 208 may be incorporated with the memory 206 or may be distinct therefrom.

The components of the computing system 200 may be communicatively coupled by the bus 210 and/or the processor 204 to one another and/or the other components of the computing system 200. In some implementations, the components may include computer logic (e.g., software logic, hardware logic, etc.) executable by the processor 204 to provide their acts and/or functionality. In any of the foregoing implementations, the components may be adapted for cooperation and communication with the processor 204 and the other components of the computing system 200.

It should be noted that while various methods, operations, and features are described herein, for example, in reference to FIGS. 3A-8B, other operations, orders, combinations, or features are possible and contemplated herein. For instance, the operations of FIG. 5B and/or FIG. 5C may represent an extension or additional details to those of FIG. 5A or vice versa. Accordingly, while some or all of the operations or features described herein may be used together, they may be used separately or interchangeably with each other or with other operations or features without departing from the scope of this disclosure.

Figure 3:
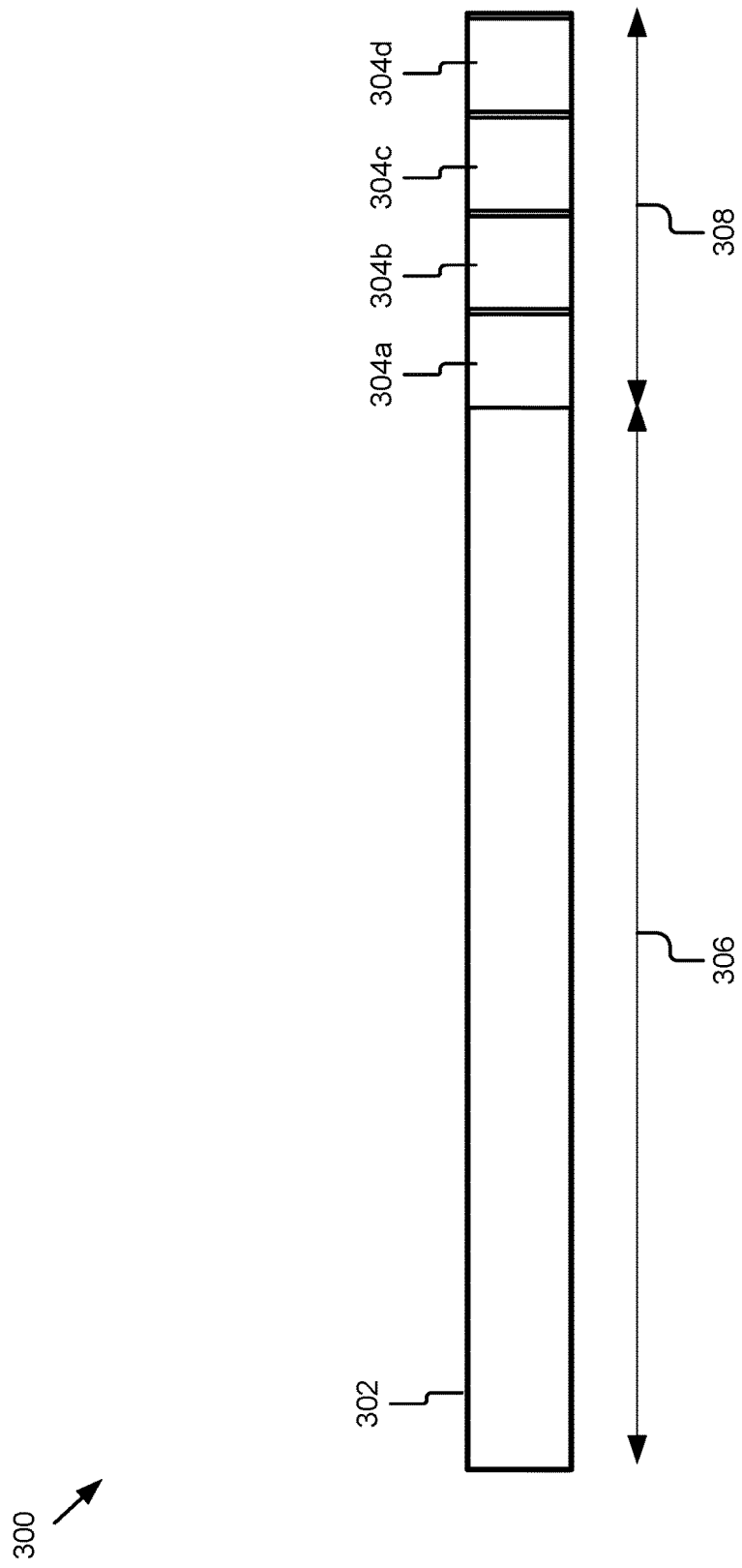
FIG. 3 illustrates a diagram of a wireless spectrum used by wireless client devices, such as mobile phones with cellular radios.

FIG. 3 illustrates a simplified diagram 300 of a wireless spectrum used by wireless client devices 106, such as mobile phones with cellular radios. The spectrum may include various ranges of frequencies, which may represent bands or channels. As an example, the spectrum may include frequencies such as a non-terrestrial band n256 (e.g., uplink) and NR (new radio) band n70 (e.g., downlink, which may have overlapping frequencies. It should be noted that other implementations are possible and contemplated herein.

Wireless operators of terrestrial cellular networks may use satellite 142 operators to support non-terrestrial cellular (e.g., LTE) IoT communications for wireless client devices 106, for example to send SMS text messages or emergency messages in special coverage areas. For instance, a ship may include a wireless client device 106 that may benefit from communication in areas without terrestrial coverage in order to send SMS messages or SOS messages.

As illustrated, the terrestrial cellular (e.g., 5G wireless) and non-terrestrial (e.g., LTE) IoT networks may use the same or adjacent frequencies or spectrum(s) to maximize spectrum efficiency. In some instances, a wireless operator may use physical resource block, band, or channel spectrum blanking and leave some blocks or frequencies of the spectrum for use by a non-terrestrial network. The spectrum blanking may be of frequencies or ranges of frequencies. For instance, the spectrum blanking ranges may incrementally cover discrete channels, bands, or physical resource blocks (e.g., certain identified physical resource blocks may be blanked), although it may additionally or alternatively be determined or defined as a continuous range of frequencies.

For instance, as illustrated in the example of FIG. 3, the block 302 may represent an available spectrum (e.g., ranging from lower frequencies at a left end to higher frequencies at a right end) for wireless communications, for example, by a terrestrial cellular provider over 5G or another protocol or band(s). The available spectrum may represent a range of frequencies used by a cellular radio of a client device 106 and/or a spectrum owned by a certain wireless network provider.

The available spectrum may include divisions, such as frequency or physical resource blocks or bands 304a, 304b, 304c, and 304d, which may be used or reserved for a non-terrestrial network (e.g., provided by a satellite 142). For instance, an individual or set of physical resource block(s) 304 may be used by separate satellites 142 for communication with client devices 106 having communication capabilities in that frequency.

It should be noted that a physical resource block may be a band, set, or range of frequencies. For purposes of description herein, the term band, channel, or physical resource block may be used interchangeably to refer to one or more frequencies (e.g., a range of frequencies). For instance, a spectrum may be divided into physical resource blocks or bands that may be used by terrestrial (e.g., a cell tower) or non-terrestrial (e.g., a satellite 142) hardware.

Depending on the implementation, as illustrated the terrestrial network may use a portion 306 of the spectrum for wireless communication (e.g., 5G) and leave one or more bands blank for the non-terrestrial network. As illustrated, four bands are left in the spectrum (e.g., at the top of band 70) for use by a non-terrestrial network, which may be in a guard band or a less used band, although other implementations are possible. For instance, a terrestrial network scheduler (e.g., the spectrum scheduler 108, as described below) may not use/may reserve one or more bands to allow use by a non-terrestrial network. As an example, a band, channel, or physical resource block may be a unit of scheduling in the frequency domain. For instance, spectrum may include twelve subcarriers of 15 kilohertz or 180 kilohertz, four of which may be in a portion 308 of the spectrum provided for use in the non-terrestrial network.

Figure 4A:
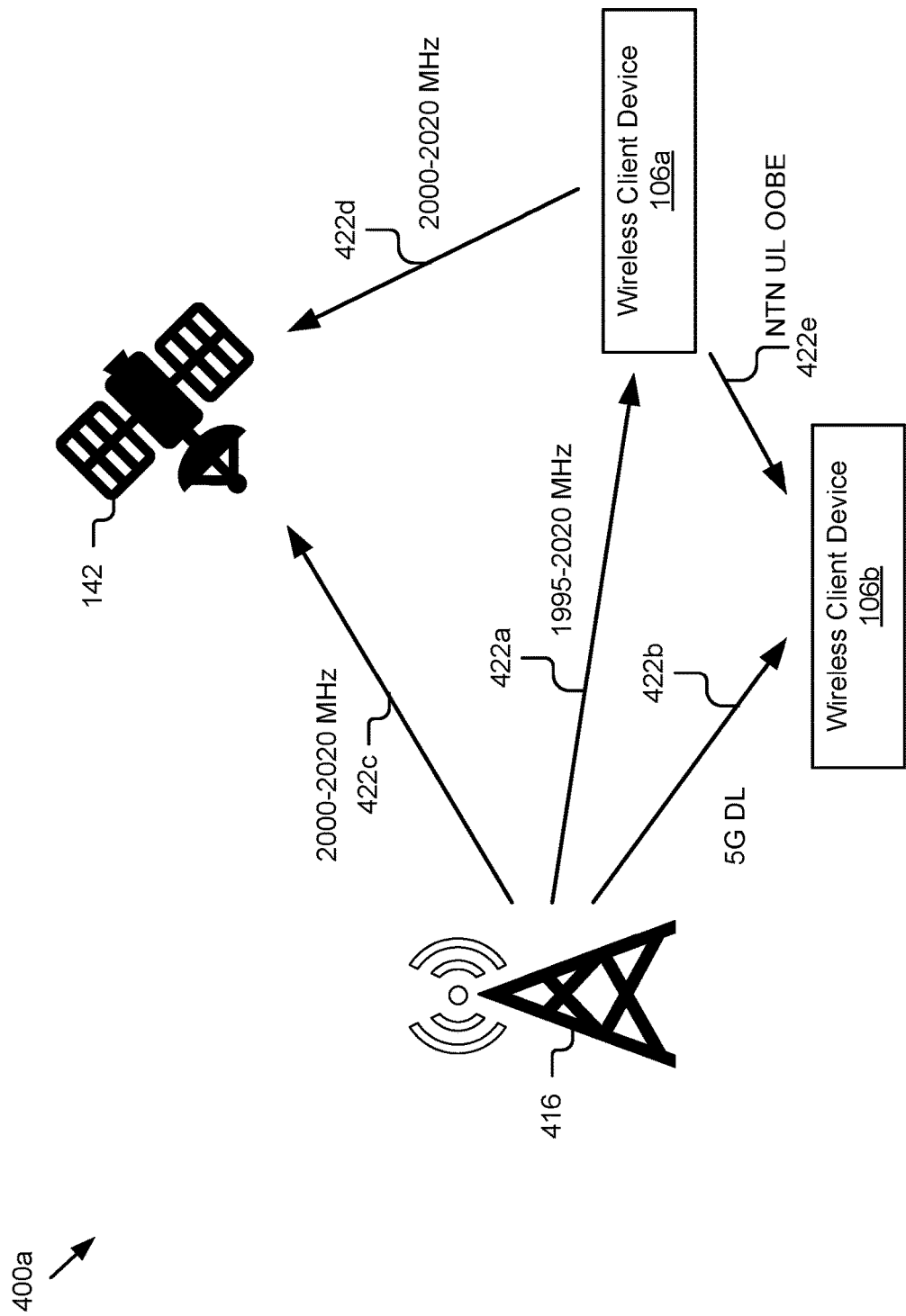
FIGS. 4A and 4B illustrate example diagrams of an example wireless environments in which interference issues may be present.

FIG. 4A illustrates an example diagram 400*a* providing an example wireless environment in which interference issues may be present. The diagram 400*a* includes a first wireless client device 106*a*, a second wireless client device 106*b*, a cell tower (e.g., an example of ground node(s) 116), and a satellite 142. It should be noted that the specific orientation, quantity, and arrangement of devices is provided as an example and that other arrangements are possible.

The diagram 400*a* also includes example signal lines 422*a*, 422*b*, 422*c*, 422*d*, and 422*e*, which illustrate electromagnetic waves transmitted and/or received by various devices. Example wavelengths are also provided for the signals. The signals 422*a* . . . 422*e* represent transmitted signals and/or their interferences, such as via out-of-band emission. It should be noted that, depending on the frequencies and communication protocols, different levels of interference may be present.

In the illustrated example, the cell tower 416 is transmitting signals 422*a* (e.g., including frequency range 1995-2020 MHz) and 422*b* (e.g., including a 5G downlink, 1995-2020 MHz, and/or other frequencies) to wireless client devices 106*a* and 106*b*, respectively. Additionally, the first wireless client device 106*a* may be transmitting via signal line 422*d* (e.g., including frequency range 2000-2020 MHz) to the satellite 142.

The depicted example diagram 400*a* illustrates at least two types of signal interferences. For example, the signal 422*b* from the cell tower 416 (e.g., the 5G downlink) may cause interference on the signal line 422*d* uplink (e.g., the interference of 422*d* may be represented by line 422*a*). For example, the wireless signals from the cell tower 416 may interfere with signals from a wireless client device 106*a* to a satellite 142. For instance, the signal 422*c* may represent interference on the signal 422*d*. It should be noted that this type of interference (e.g., from a cell tower 416 on a client device 106*a* attempting to communicate with a satellite 142) may be affected by various factors, such as the higher power of the cell tower 416, the antenna tilt of the cell tower 416, the effectiveness of filters or directional antennas of the cell tower 416, the relative distances between devices, the frequencies being used, the relative proximity of frequencies being used, and/or other factors.

Signal line 422*e* (e.g., including a non-terrestrial uplink out-of-band emission where signal 422*d* includes transmission via a non-terrestrial band 304) may represent interference from wireless client device 106*a* to wireless client device 106*b*. For instance, as the first wireless client device 106 transmits a signal 422*d* to the satellite 142, this signal (represented by line 422*e*) may interfere with the signal 422*b* to the second wireless client device 106*b*. It should be noted that this type of interference (e.g., from a client device 106*a* attempting to communicate with a satellite 142 on a signal from a cell tower 416 to a second client device 106*b*) may be affected by various factors, such as the relative distances between devices, the directionality of antennas, the frequencies being used or their proximity, frequency filters, relative signal strengths, angles between devices, and/or other factors.

It should be noted that the out of band emissions of the non-terrestrial communication (e.g., from the first wireless client device 106*a*) at a cell edge of a 5G network in areas with a small satellite 142 elevation angle can create a large amount of interference with the downlink reception of a 5G device (e.g., by the second wireless client device 106*b*).

Accordingly, implementations of the technologies described herein may address these various types of interference, for example, by adjusting band used, spectrum blanking ranges, and/or assigned/assignable channels/frequencies.

Figure 4B:
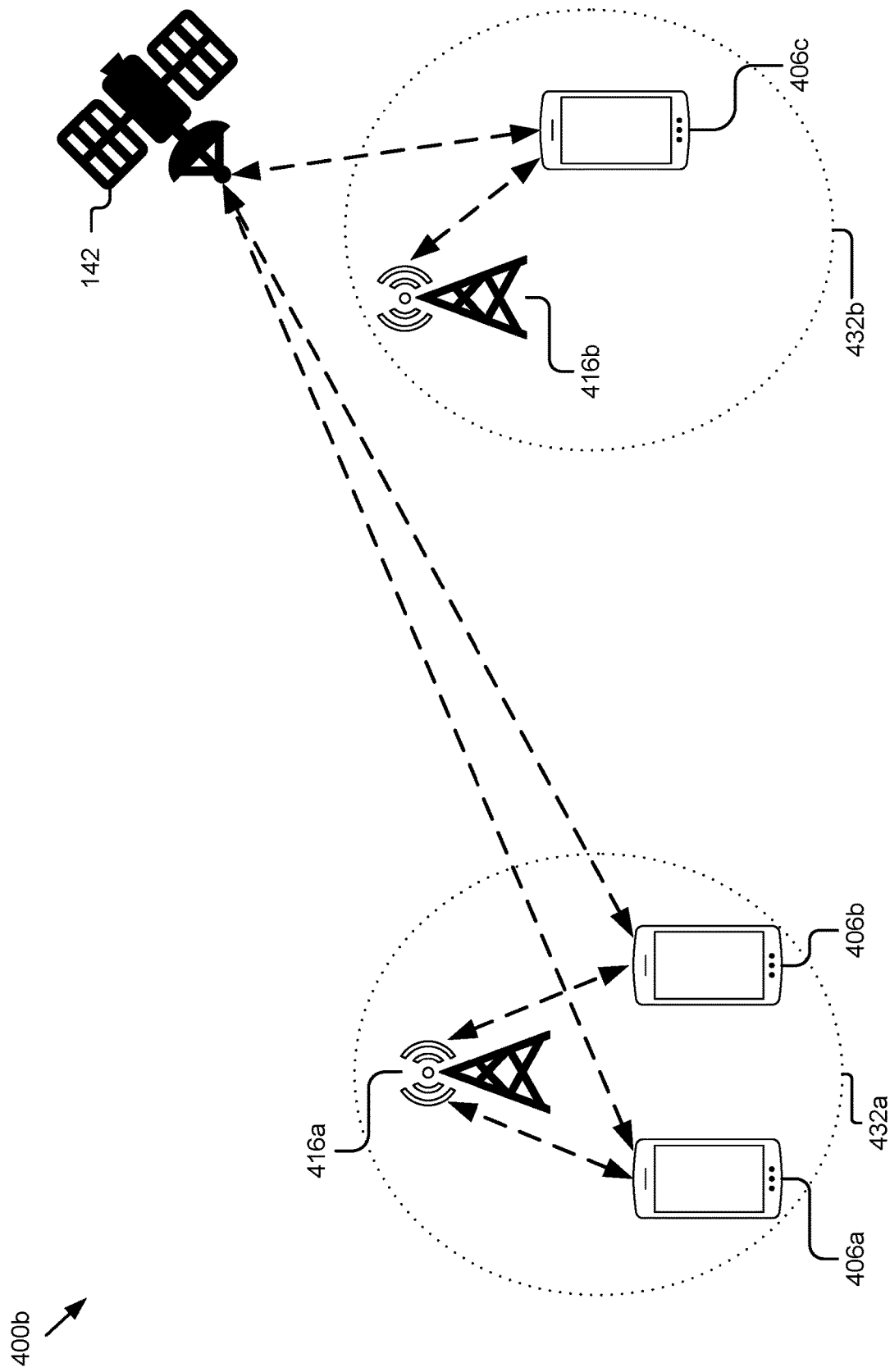

FIG. 4B illustrates an example diagram 400*b* providing an example wireless environment in which interference issues may be present. The example diagram 400*b* illustrates varied distances and/or elevations between devices and a satellite 142. As illustrated, a satellite 142 may serve the same area as multiple terrestrial cells 432*a* and 432*b* (e.g., served by a first cell tower 416*a* and a second cell tower 416*b*, respectively). The diagram 400*b* includes two cellular devices 406*a* and 406*b* in a first cell 432*a* served by a first cell tower 416*a*. One or both of the devices 406*a* and 406*b* may be in communication with one or both of the first cell tower 416*a* and the satellite 142, as illustrated. The diagram 400*b* also includes a third cellular device 406*c* in a second cell 432*b* in communication with one or both of the second cell tower 416*b* and the satellite 142. The cellular devices 406 may represent wireless client devices 106 and the cell towers 416 may represent ground node(s) 116.

As illustrated, a first cell 432*a* (and its devices) may be at a lower elevation angle to the satellite 142 than the second cell 432*b* (and its devices), which has a higher elevation angle to the satellite 142. Because the distance between devices 406*a* and 406*b* in a cell 432*a* may be less than the distance between cells 432*a* and 432*b*, the spectrum scheduler 108 may assume that signal strength between devices 406*a*/406*b* and the satellite 142 are the same or relatively the same. The spectrum scheduler 108 (e.g., executed on or controlling a cell tower 416) may determine the elevation angle for a cell and/or the transmit power for the non-terrestrial network, which may be determined based on the elevation angle and/or distance between the cell 432 and satellite 142, as described below. For example, the spectrum scheduler 108 may determine signal strength and/or transmit power between the devices 406 and the satellite 142 using the elevation angle and/or distance. For example, in the illustrated implementation of FIG. 4B, the lower elevation angle devices (e.g., devices 406*a* and 406*b*) may have a higher uplink transmission power than higher elevation angle devices (e.g., device 406*c*), which may have a relatively lower uplink transmission power.

In some implementations, the spectrum scheduler 108 may also determine the signal strength and/or transmit power between a cell tower 416 and a cellular device 406. Additionally, the spectrum scheduler 108 may determine an out of band emission signal strength of a non-terrestrial network based on attributes of the satellite 142, such as its specifications, the elevation angle, and/or the distance to the satellite 142. Accordingly, using these and/or other factors, the spectrum scheduler 108 may generate various mitigation strategies, such as determining spectrum blanking ranges and/or assigning frequencies/channels, among other technologies.

Figure 5A:
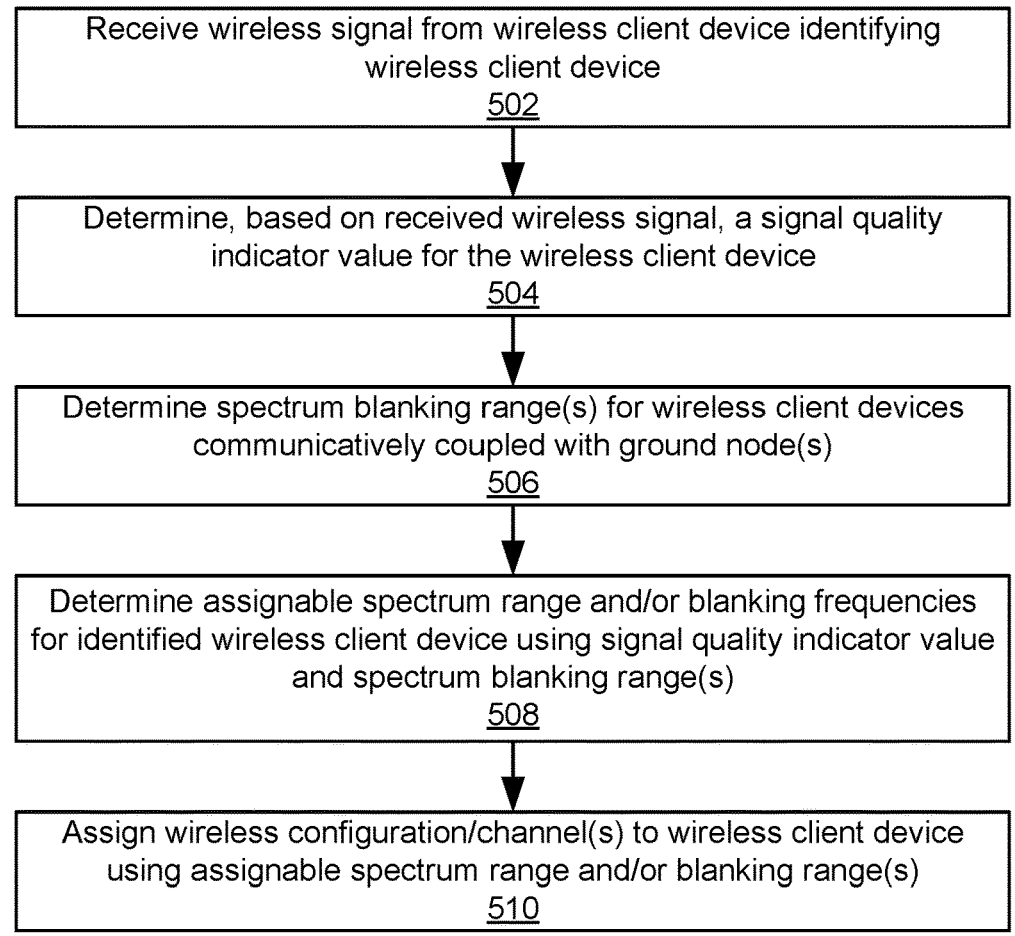
FIG. 5A is a block diagram illustrating an example method for managing interference for wireless devices in a non-terrestrial network environment.

FIG. 5A is a block diagram 500*a* illustrating an example method for managing interference for wireless devices in a non-terrestrial network environment. The method provides various operations in which the scheduler may schedule (in the frequency domain) use of the frequency spectrum. For instance, the spectrum scheduler 108 may map spectrum blanking and/or assignable spectrum to wireless client devices 106 using their signal strength, proximity to a cell tower, satellite 142 elevation, satellite 142 distances, and other factors.

At 502, the spectrum scheduler 108 may receive a wireless signal from a wireless client device 106, which may identify the wireless client device 106. For instance, a ground node(s) 116 on which the spectrum scheduler 108 is executed or with which the spectrum scheduler 108 is communicatively coupled may receive a signal or message via a control channel, such as a request for registration or authorization to use the ground node(s) 116 in the cell, although other implementations are possible. In some instances, the wireless signal may indicate a strength with which it was transmitted, a strength of a signal received from the ground node(s) 116, or another indicator of cellular network/signal quality, for example, the wireless signal may indicate a channel quality information or indicator (also referred to herein as signal quality indicator) value.

At 504, the spectrum scheduler 108 may determine, based on the received wireless signal(s), a signal quality indicator value (or other indicator of signal strength) for the wireless client device 106. For instance, the signal quality indicator may be determined relative to one or more antennas of the ground node(s) 116.

At 506, the spectrum scheduler 108 may determine one or more spectrum blanking ranges for wireless client devices 106 communicatively coupled with a ground node(s) 116 (e.g., a cell tower(s), cellular antenna(s)) for a cell. For instance, the spectrum blanking range(s) may restrict wireless frequencies, bands, or channels in the one or more spectrum blanking ranges from being assigned to a wireless client device 106, for example, by a ground node(s) 116.

It should be noted that certain operations described herein may be performed in advance or may be performed in real time. For instance, the spectrum scheduler 108 (or another component) may determine spectrum blanking ranges for certain (e.g., for ranges thereof) signal quality indicator values in advance and then assign a client device 106 to a range when the client device 106 attempts to connect to a ground node(s) 116. In some instances, spectrum blocking ranges may be determined for multiple cells or ground node(s) 116 and then customized to a specific cell or corresponding ground node 116 using factors, such as satellite 142 elevation or non-terrestrial bands used in the same geographic region as the cell. The spectrum scheduler 108 may then determine a signal quality indicator value of a client device 106 to determine a spectrum blanking range, assignable frequency range, and/or channel for that client device 106. It should be noted that the values and calculations may be initiated, periodically updated, or performed at various frequencies.

It should be noted that the definition of blanking or assignable frequency ranges, bands, blocks (e.g., physical resource blocks), or channels, may be defined positively or negatively the by the spectrum scheduler 108. For example, in some implementations, the spectrum scheduler 108 may define blanking ranges in which frequencies are not assigned/used for communication. Additionally, or alternatively, the spectrum scheduler 108 may positively determine frequency ranges that may be assigned for communication. For instance, a positively determined assignable frequency range may be the inverse of a blanking frequency range.

In some implementations, the spectrum scheduler 108 may determine spectrum blanking ranges based on the signal quality indicators/indicator values for a wireless client device 106 (e.g., for an identified client device 106 and/or a generic client device 106). The signal quality indicator value may indicate that the client device 106 has a certain quality of cellular signal relative to a cell node 116 and, based on this value, the spectrum scheduler 108 may determine a certain spectrum blanking specific to the client device 106. For example, if the signal quality indicator value indicates that the cell reception is poor for the client device 106, the spectrum scheduler 108 may assign a relatively large blanking range to the client device 106. Similarly, if the cell reception is good for the spectrum scheduler 108 may assign a relatively small blanking range to the client device 106. Accordingly, the spectrum scheduler 108 may intelligently prevent the client device 106 from being assigned frequencies/channels that are more likely to receive or cause interference from a non-terrestrial signal.

As an illustration of how this implementation addresses interference issues, a second client device 106 may transmit signals in a non-terrestrial network (e.g., to a satellite 142) which may cause interference in a first client device 106 that is in communication with a ground node(s) 116 in a terrestrial network. As the signal strength of the terrestrial network decreases for the first client device 106, the odds of the second client device's 106 (and/or the satellite's 142) signals causing harmful interference for the first client device's 106 terrestrial communications increase. Accordingly, the spectrums scheduler may automatically increase the amount of spectrum between the frequencies, bands, or channels used by the two devices/networks.

It should be noted that in addition to, or in alternative to, the signal quality indicator, the spectrum scheduler 108 may use the location of a client device 106 to determine spectrum blanking ranges. For example, the spectrum scheduler 108 may determine larger or differently positioned spectrum blanking ranges to client devices 106 farther from the ground node(s) 116/tower and/or may determine smaller or higher spectrum blanking ranges. For example, the location and/or proximity may be interchangeable and/or serve as an indicator or proxy for the signal quality indicator.

Figure 6A:
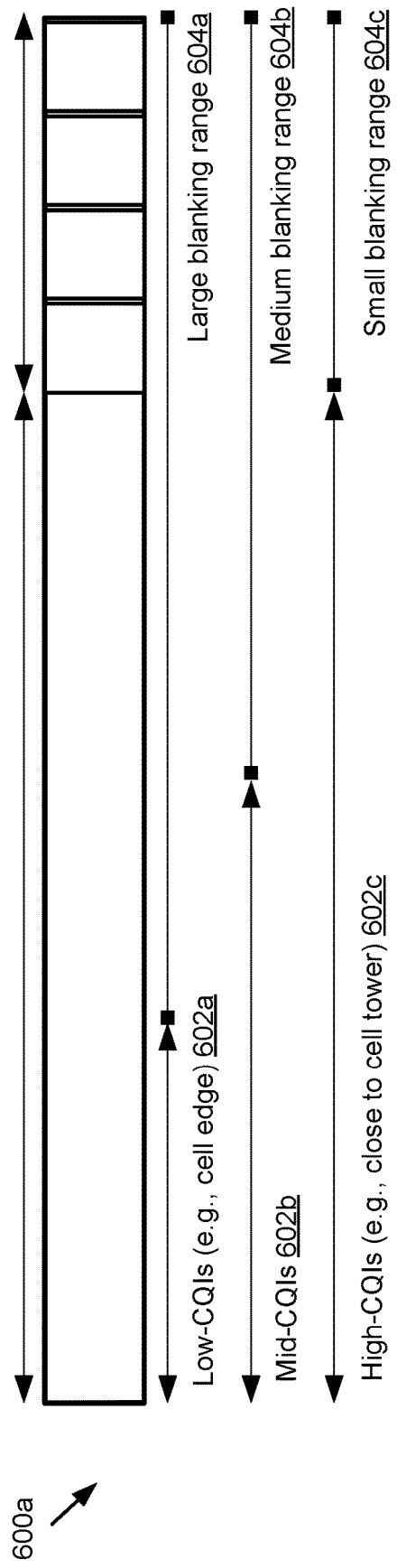
FIGS. 6A and 6B illustrate example diagrams of a wireless spectrum used by wireless client devices, such as mobile phones with cellular radios along with example blanking ranges.

In some implementations, spectrum blanking ranges may be associated with certain signal quality indicator values or ranges thereof. For instance, signal quality indicator values may be bucketed into high, medium, and low; although, other numbers or types of buckets are possible. Blanking ranges may be determined for each of the buckets. For example, as illustrated in FIG. 6A, assignable spectrum ranges and/or blanking ranges may correspond to each of the buckets of signal quality indicator values. It should be noted that in some implementations, the assignable ranges or blanking ranges may be infinitely variable or have smaller increments/buckets.

FIG. 6A illustrates a simplified diagram 600*a* of a wireless spectrum used by wireless client devices 106, such as mobile phones with cellular radios. As described in reference to FIG. 3, the spectrum may include frequency bands or frequency ranges used by a terrestrial network and a non-terrestrial network. FIG. 6A further illustrates assignable spectrum ranges 602 and/or spectrum blanking ranges 604, but it should be noted that these ranges, their relative sizes, and their relationships to the available spectrum may vary without departing from the scope of this disclosure.

In the illustrated example of FIG. 6A, the spectrum scheduler 108 may determine a relatively small assignable spectrum range 602*a* and/or a large blanking range 604*a* for client devices 106 with low signal quality indicator values (e.g., for client devices 106 located at a cell edge). The spectrum scheduler 108 may determine a relatively medium-sized assignable spectrum range 602*b* and/or a medium-sized blanking range 604*b* for client devices 106 with mid-signal quality indicator values. The spectrum scheduler 108 may determine a relatively large assignable spectrum range 602c and/or a small blanking range 604c for client devices 106 with high signal quality indicator values (e.g., for client devices 106 located close to a cell tower). It should be noted that other thresholds and ranges may be used. It should also be noted that the relative sizes of ranges illustrated herein are provided for illustration and may not represent real-world relative scales or sizes of the ranges.

It should be noted that while the spectrum scheduler 108 may assign spectrum blanking ranges to cover the portions of the spectrum used by other networks, such as the non-terrestrial network (e.g., as described above), other configurations are possible. For instance, the spectrum blanking ranges may be located at a top, bottom, center, and/or other portion of the assignable spectrum for wireless client devices 106.

Although the assignable spectrum ranges and/or blanking ranges are illustrated as matching perfectly to each other and to the bands of the terrestrial and non-terrestrial networks, the spectrum scheduler 108 may also determine or provide buffer ranges that decrease out-of-band emissions, for example, by further separating the assignable ranges spectrum used by a non-terrestrial network.

Returning to the description of FIG. 5A, in some implementations, the spectrum scheduler 108 may determine the spectrum blanking ranges using the position of the client device(s) 106, ground node(s) 116, and/or satellite(s) 142. For example, the spectrum scheduler 108 may determine one or more satellites 142 that serve a geographic area corresponding to a cell area of the ground node(s) 116 with which the client device 106 is communicating. The spectrum scheduler 108 may set the spectrum blanking range(s) based on the position of the satellite 142, for example, relative to the client device 106 and/or a ground node(s) 116 (e.g., cell tower).

In some implementations, the spectrum scheduler 108 may know the signal quality indicator value(s) for wireless client device(s) 106, but not their locations directly. As noted above, the relative locations to a ground node(s) 116 may be inferred from the wireless quality indicator value(s). The spectrum schedule may know a client device's 106 location is within a cell served by the ground node(s) 116 and may therefore, for purposes of the proximity, geographic region, and/or elevation angle computations described herein, determine that all client devices 106 in the cell are located at the same location (e.g., at the location of the ground node(s) 116 or cell tower). Accordingly, the spectrum scheduler 108 may use the location of the ground node(s) 116/cell tower in calculations of the relative strength of the non-terrestrial network's signals from/to a satellite 142, which information may be used to determine how susceptible the client devices 106 are to receive or cause interference, which may be used to assign spectrum ranges and/or blanking ranges, as described elsewhere herein.

In some implementations, the spectrum scheduler 108 may use the proximity and/or elevation (e.g., which affects the signal strength and/or interference characteristics, as described elsewhere herein) between satellite 142 and the ground node(s) 116 (and/or client device 106) to determining the sizes/configuration of the blanking ranges. For instance, when the satellite 142 is closer to the wireless client device 106, the spectrum scheduler 108 may determine a larger blanking range. Similarly, a lower elevation angle may cause the spectrum scheduler 108 to assign a larger blanking range. The determination of assignable spectrum ranges/blanking ranges using proximity and/or elevation angle is described in further detail in reference to FIG. 5C.

In some implementations, the spectrum scheduler 108 may use the non-terrestrial network's bands, such as the physical resource blocks of satellites 142 serving the same area as the cell/a ground node(s) 116, to determine the assignable ranges/blanking ranges. For instance, different satellites 142 may use different bands, and the spectrum scheduler 108 may determine these blocks/bands based on the specific location (e.g., based on a mapping of bands to geographical areas) served by a satellite 142 and/or the satellite's 142 location as well as, for instance, the location of the cell, ground node(s) 116, and/or client device 106. These and other implementations are described in further detail in reference to FIG. 5B.

At 508, the spectrum scheduler 108 may determine an assignable spectrum range and/or blanking frequencies for the identified wireless client device 106 using the determined signal quality indicator value and the determined spectrum blanking range(s). For instance, the spectrum scheduler 108 may determine an assignable spectrum range and/or blanking range(s)/frequencies for a specific wireless client device 106 by placing the specific wireless client into a bucket or range computed at 506. For example, where three buckets or groupings were determined at 506, the spectrum scheduler 108 may assign the identified client device 106 to a bucket based on its signal quality indicator value's proximity to bucket threshold(s).

At 510, the spectrum scheduler 108 may assign a wireless configuration/channel(s) to the identified wireless client device 106 using the determined assignable spectrum range and/or the blanking ranges. For instance, the spectrum scheduler 108 may assign a specific channel or frequency pair to the identified wireless client device 106, for example, for communication with the terrestrial ground node(s) 116. The channel may be selected from available spectrum outside the spectrum blanking range(s). Accordingly, where blanking ranges are small, there is increased flexibility in which channel is assigned while where blanking ranges are large, the assignable channels are more limited.

As an illustrative example, returning to FIG. 6A, a wireless client device 106 having a high signal quality indicator value may be assigned a channel within the range of frequencies represented by 602c, while a wireless client device 106 having a low signal quality indicator value may be assigned a channel within the smaller range of frequencies represented by 602a. As described elsewhere herein, additional or alternative factors to the signal quality indicator may be used to determine and/or assign channels and/or blanking ranges.

Accordingly, client devices 106 that are less susceptible to cause and/or receive interference may be intelligently assigned channels that reduce the interference. For instance, the spectrum scheduler 108 may assign a channel (e.g., for a terrestrial cellular network) to a client device 106 that intelligently minimizes interference from a second client device 106 communicating with a non-terrestrial network and/or other interference while also maximizing coexistence and efficiency of the wireless spectrum.

Figure 5B:
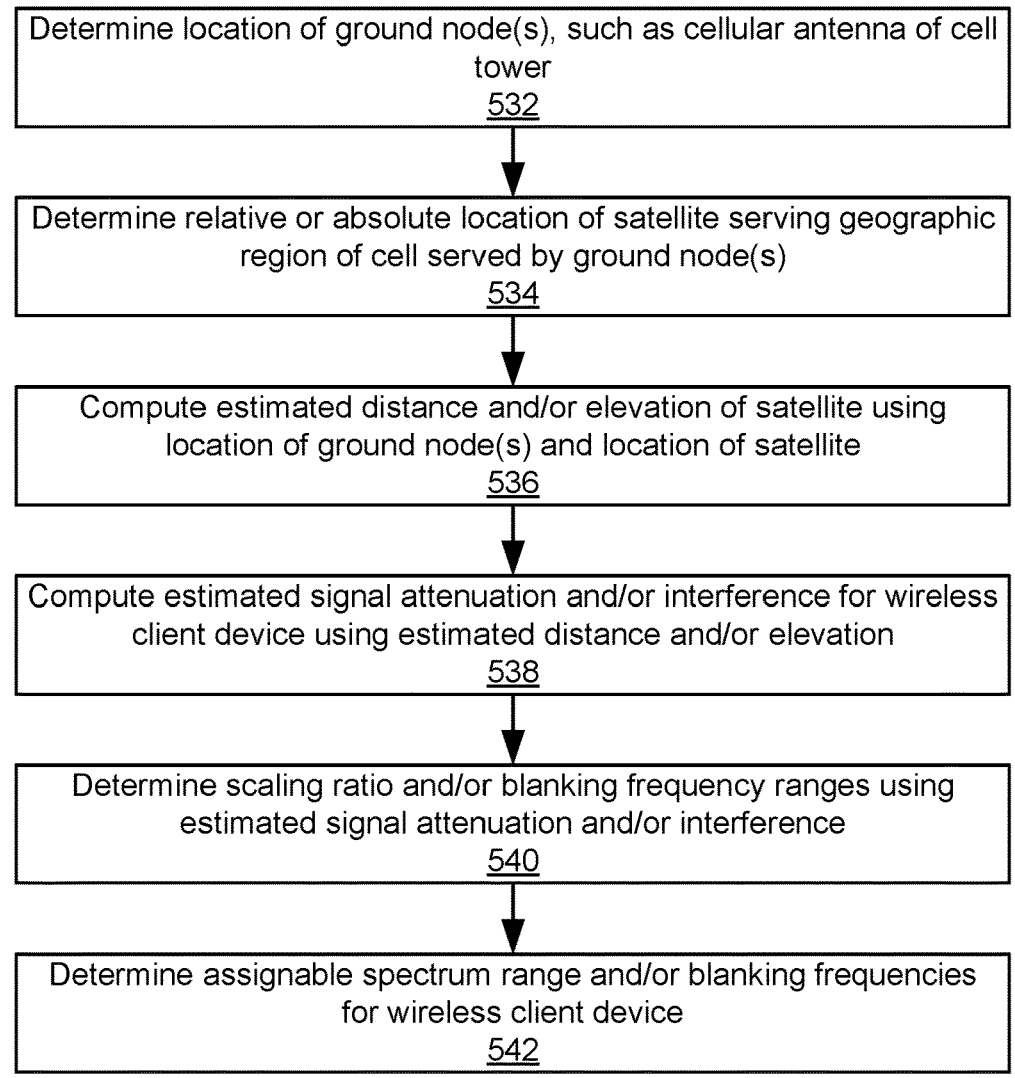
FIG. 5B is a block diagram illustrating an example method for managing interference for wireless devices in a non-terrestrial network environment, for example, using a location and/or elevation angle of a satellite.

FIG. 5B is a block diagram 500b illustrating an example method for managing interference for wireless devices in a non-terrestrial network environment, for example, using a location and/or elevation angle of a satellite 142. FIG. 5B may provide additional or alternative features, operations, or details relevant to 506 in FIG. 5A above. Depending on the implementation, some or all of the operations of the method in FIG. 5B may be used in a terrestrial cellular network to mitigate interference issues from signals transmitted to a satellite 142 and/or by a satellite 142 in a non-terrestrial network.

As noted above in reference to FIGS. 4B and 5A, the proximity and or relative elevation angle of a satellite 142 to a client device 106 may impact the interference characteristics of the available cellular spectrum. In some instances, in order to overcome data restrictions or limitations, the spectrum scheduler 108 may assume that client devices 106 in a certain cell are located in the same position relative to a satellite 142 for the computations.

At 532, the spectrum scheduler 108 may determine a location of a ground node(s) 116, such as a cell tower, and/or of a cell. For instance, the location may be determined based on coordinates stored in a database 128, based on GPS (Global Positioning System) coordinates, or another means. In some instances, the spectrum scheduler 108 may assume that, for purposes of mitigating interference associated with the proximity and/or angle of the satellite 142, all client devices 106 in the cell are located at the same geographic location, which may be the location of some or all of the ground node(s) 116 or of the cell area (e.g., a center thereof), so the client devices 106 also have the same proximity and/or elevation angle to the satellite 142.

In some implementations, at 534, the spectrum scheduler 108 may determine a relative or absolute location of a satellite 142 serving the geographic region of the cell served by the ground node(s) 116. For instance, the spectrum scheduler 108 may retrieve a file from the database 128 indicating an absolute or dynamic location of the satellite 142. In some implementations, the location of the satellite 142 may be determined using other means, such as strengths or angles of signals received from the satellite 142, direct communication with the satellite 142, or communication with a service that tracks or communicates with the satellite 142 (e.g., the network server 122 or third-party server 118).

In some implementations, at 536, the spectrum scheduler 108 may compute an estimated distance and/or elevation angle to the satellite 142 using the location of the ground node(s) 116 and location of the satellite 142. For instance, using the satellite's 142 position in combination with the cell/a ground node's position, the spectrum scheduler 108 may triangulate the distance between the two devices and/or the elevation angle of the satellite 142 (e.g., relative to vertical, relative to the horizon, or otherwise) relative to the cell/ground node(s) 116. As noted above, in some implementations, the spectrum scheduler 108 may assume that all devices (e.g., client devices 106, ground node(s) 116, etc.) in a cell have the same elevation angle and/or distance to the satellite 142.

In some implementations, at 538, the spectrum scheduler 108 may compute an estimated signal attenuation and/or interference for a wireless client device 106 using the estimated distance and/or elevation angle for the satellite 142. In some instances, the signal attenuation of the signal from the satellite 142 may be directly measured by the spectrum scheduler 108, for example, using a ground node(s) 116 and a known attribute of the signal/satellite 142, such as its broadcast power and/or band. In some instances, the spectrum scheduler 108 may also know (e.g., based on files stored in the database 128) attributes of the signal/radio, such as the out-of-band emission characteristics of the signal/radio.

The spectrum scheduler 108 may determine that client devices 106 communicating with the satellite 142 would use a certain signal strength using the estimated signal attenuation. Accordingly, the spectrum scheduler 108 may infer that a wireless client device 106 transmitting a signal to the satellite 142 would use a defined transmission power and therefore have an associated likelihood of causing interference with client devices 106 in the terrestrial network, such as that provided by the ground node(s) 116. Accordingly, the spectrum scheduler 108 may adjust assignable spectrum ranges and/or spectrum blanking ranges based on the distance and/or elevation angle to the satellite 142.

At 540, the spectrum scheduler 108 may determine a scaling ratio and/or blanking frequency ranges using the estimated signal attenuation and/or interference characteristics caused by the distance and/or elevation angle of the satellite 142. For instance, the spectrum scheduler 108 may determine a size of the one or more spectrum blanking ranges based on the elevation angle, where a lower elevation angle (e.g., relative to the horizon) may result in a larger blanking range, and a higher elevation angle may result in a smaller blanking range, as described above in reference to FIG. 4B.

Similarly, in some implementations, the spectrum scheduler 108 may determine a size of the one or more spectrum blanking ranges based on a distance between the ground node(s) 116 (and/or client device 106) and the satellite 142. For instance, a larger distance may result in a larger blanking range while a shorter distance may result in a smaller blanking range.

The effect of the distance and/or elevation angle of the satellite 142 (and/or its other attributes) may be defined in terms of a scaling ratio, an additional frequency or band offset, or otherwise. For instance, as the estimated signal attenuation increases, the spectrum blanking range(s) for the buckets of client devices 106 (e.g., based on their signal quality indicators) may be enlarged or shifted.

Figure 6B:
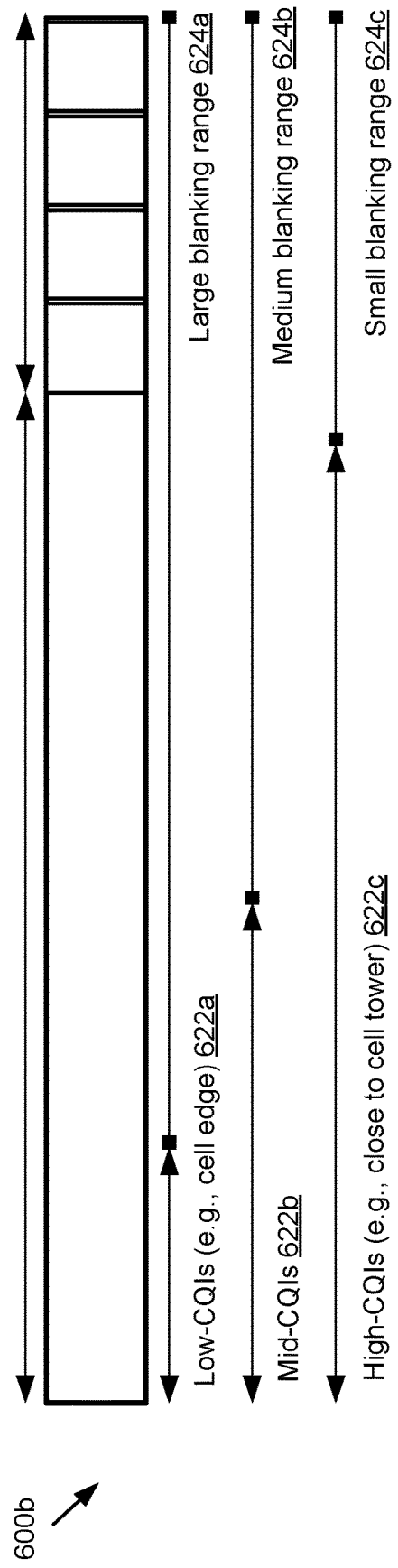

For example, FIG. 6B illustrates a simplified diagram 600b of a wireless spectrum used by wireless client devices 106, such as mobile phones with cellular radios. The diagram 600b replicates that of FIG. 6A with the additional factor of the estimated signal attenuation for the satellite 142 also included. For instance, the diagram 600b illustrates assignable spectrum/frequency ranges 622a, 622b, and 622c (and corresponding blanking ranges 624a, 624b, and 624c), which may correspond to 602a, 602b, and 602c with the additional factor of the satellite 142 signal attenuation included. For example, the diagram 600a of FIG. 6A may represent the frequency ranges 602 and 604 for an instance where a satellite 142 has a high elevation angle and/or short distance from the cell, a ground node(s) 116, and/or client device 106. On the other hand, the diagram 600b of FIG. 6B may represent the frequency ranges 622 and 624 for an instance where a satellite 142 has a low elevation angle and/or long distance.

As illustrated in the variation between the assignable and/or blanking ranges between the diagram 600a and 600b, the spectrum scheduler 108 may shift the blanking ranges for the terrestrial cellular network used by the ground node(s) 116 further from those frequencies or bands used by the non-terrestrial network/satellite 142 as the distance increases and/or the elevation angle decreases (e.g., relative to the horizon). The various buckets may be adjusted by the same scaling factors, percentages, or frequencies or by different frequencies, for example, the buckets of client devices 106 with greatest susceptibility to interference may be most-significantly impacted by changes in elevation/distance, although other implementations are possible and contemplated herein.

At 542, the spectrum scheduler 108 may determine an assignable spectrum range and/or blanking frequencies for the specific wireless client device 106, for example, as described in reference to the operations at 508 and 510.

Figure 5C:
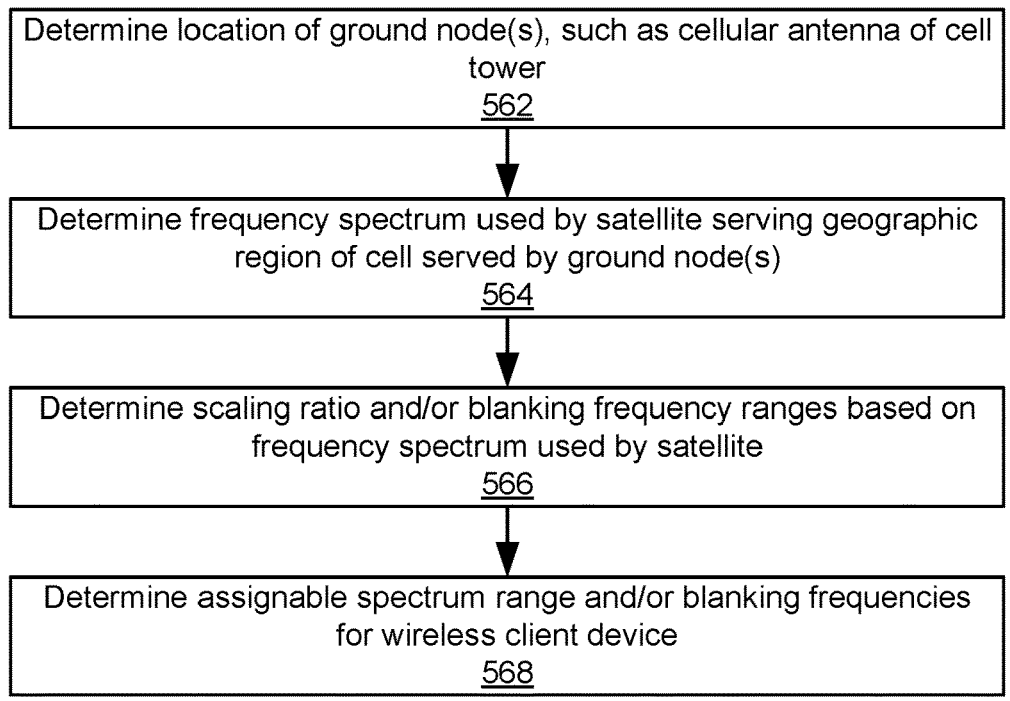
FIG. 5C is a block diagram illustrating an example method for managing interference for wireless devices in a non-terrestrial network environment, for example, based on a frequency band used by a satellite covering a region including the terrestrial cell.

FIG. 5C is a block diagram 500c illustrating an example method for managing interference for wireless devices in a non-terrestrial network environment, for example, using a geographic location of a ground node(s) 116 and/or frequency blocks/bands used by one or more satellites 142 covering the geographic location. FIG. 5C may provide additional or alternative features or details relevant to 506 in FIG. 5A above. Depending on the implementation, some or all of the operations of the method in FIG. 5C may be used in a terrestrial cellular network to mitigate interference issues from signals transmitted to a satellite 142 and/or by a satellite 142 in a non-terrestrial network.

As noted above in reference to FIG. 5A, the band(s) used by a satellite 142 may also impact the spectrum blanking ranges and/or assignable ranges. For instance, each satellite 142 and, correspondingly, geographic region served by each satellite 142, may use a defined band to provide communications with wireless client devices 106, as described in detail above. In some instances, multiple bands used are by the non-terrestrial network to facilitate communication with separate satellites 142 as if the satellites 142 serve regions or non-terrestrial based cells.

Figure 7:
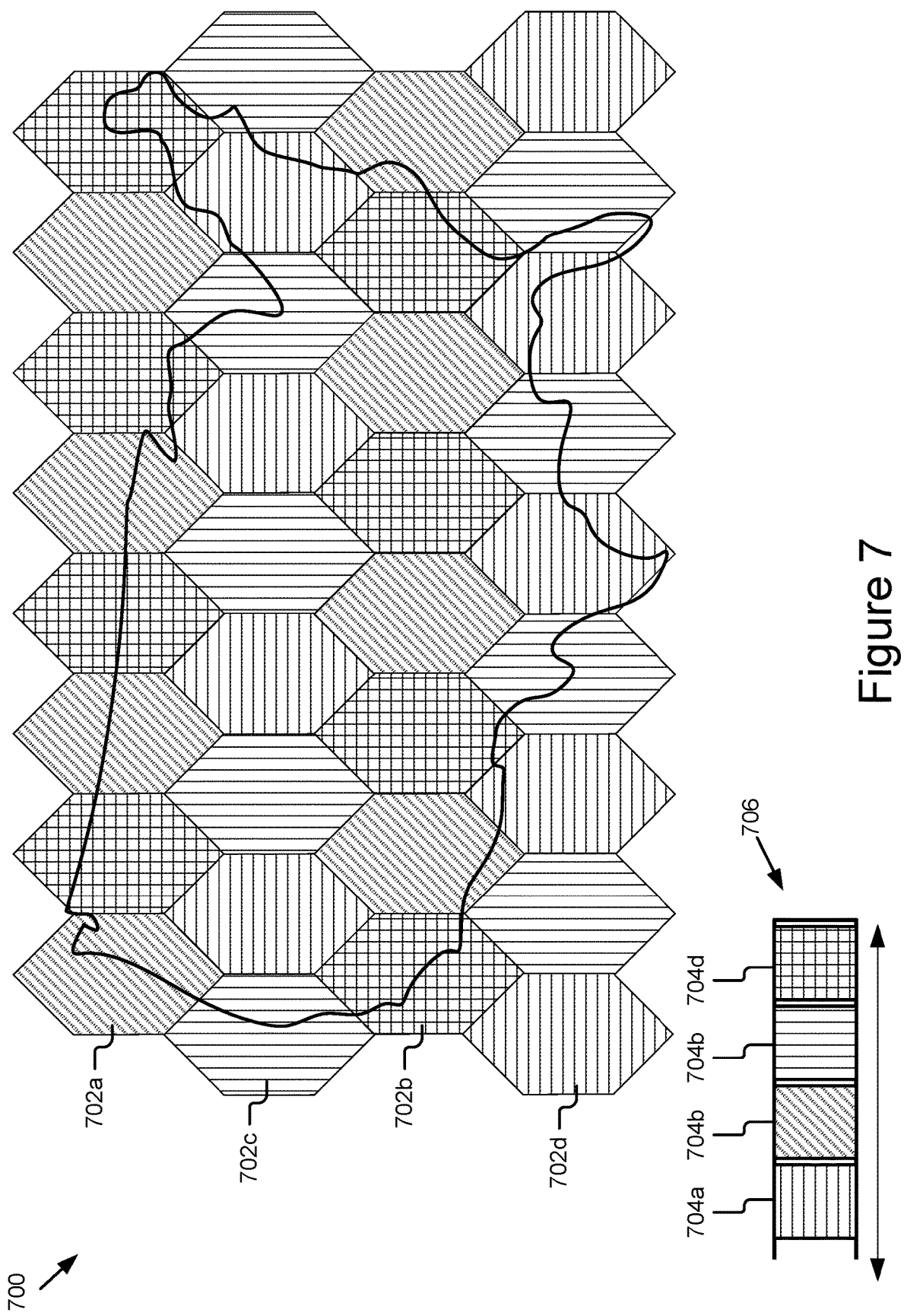
FIG. 7 illustrates an example map showing example regions served by bands used by satellites.

For example, as illustrated in reference to FIG. 7, various spectrum bands 704 may be used by the non-terrestrial network in various geographic areas. FIG. 7 illustrates an example map 700 showing corresponding example regions 702 served by satellites 142. In some implementations, a single satellite 142 may serve (e.g., provide communications for) an individual region, although other implementations, such as using multiple satellites 142 for the same region or a single satellite 142 serving multiple regions are possible.

As illustrated in FIG. 7, each geographic region 702a, 702b, 702c, and 702d may be associated with a separate band 704a, 704b, 704c, or 704d used by a satellite 142 (not shown in FIG. 7). The spectrum scheduler 108 may determine the band 704 used by a satellite 142 in a geographic region 702 in which a reference cell/ground node 116 is located (e.g., as discussed in reference to FIG. 5A) and use the determined band 704 in scaling, adjusting, assigning, or otherwise determining assignable spectrum range(s) and/or the spectrum blanking range(s), as described elsewhere herein. It should be noted that while four regions 702 are labeled, many are illustrated and additional or fewer may be used. The bands 704a . . . 704d may correspond to those described elsewhere herein, such as 304a . . . 304d, etc., respectively.

In some implementations, a single satellite 142 may have multiple beams 704 that serve separate geographical regions 702. The spectrum scheduler 108 may assign bands 704 to each beam or groups of beams of a satellite 142. A beam of a satellite 142 may be provided using one or more antennas, etc., of the satellite 142. For example, because interference among bands 704 from a single satellite 142 is greater than would be interference from bands 704 from multiple satellites 142, the spectrum scheduler 108 may schedule/assign bands 704 to the beams of a satellite 142 to avoid adjacent beams from the same satellite 142 from having adjacent bands 704, where possible. For instance, where a satellite 142 has four beams arranged in a 2×2 grid (or a similar arrangement), adjacent bands 704 may be assigned to opposing corner beams to reduce the amount of area/geographical region that is covered by adjacent bands 704 from the same satellite 142.

Additionally, or alternatively, clusters of bands 704, for example, corresponding to a single satellite 142 may be assigned as a cluster into an overall arrangement of regions 702, which may or may not be based on adjacent frequency bands 704. Clusters of bands 704 may be assigned in an arrangement to avoid overlap of the same band 704 from separate satellites 142. Where possible, clusters of bands 704 may additionally be assigned to avoid adjacent bands 704 in a frequency spectrum from being assigned to adjacent regions 702 and/or overlapping with those regions of adjacent satellites 142.

In some implementations, as illustrated in reference to FIG. 7 various arrangements of geographic regions 702 served by various satellites 142 may be used. For instance, while an example quantity, arrangement, and map are illustrated, the geographic regions 702 may be in different shapes, arrangements, locations, quantities, sizes, or other configurations.

The example arrangement of geographic regions 702 is illustrated in which each region 702 is diamond or hexagonal in shape, but they may be circular, rectangular, have overlap, or otherwise. For instance, the regions 702 may be arranged, as illustrated, in offset rows of circular or other shaped satellite 142 transmission areas and devices or cells in those areas may correspond to a nearest satellite 142 resulting in an arrangement, such as the illustrated example.

Additionally, adjacent spectrum bands 704 may be assigned to non-adjacent geographic regions 702 to reduce interference to signals by satellites 142 serving adjacent geographic regions 702 (e.g., where the geographic regions overlap or meet), as illustrated in the example of FIG. 7. For instance, where four non-terrestrial bands 704 are used, rows of alternating bands 704 may be used to separate adjacent bands 704 from being transmitted in adjacent regions 702. For example, as illustrated in the spectrum portion 706, in the illustrated implementation, a first band 704a may be used in a first region 702a, a second band 704b may be used in a second region 702b, a third band 704c may be used in a third region 702c, and a fourth band 704d may be used in a fourth region 702d. While, depending on the quantity of bands used, it may not be possible to completely avoid adjacent bands from being assigned to adjacent regions/ satellites, these interactions may be reduced by using various arrangements, such as offsetting rows of regions, as illustrated in FIG. 7.

As noted above, a spectrum scheduler 108 may access a map or table in a database 128, which represents the arrangement or locations of the geographic regions in performing its calculations. Additionally, or alternatively, the band 704 associated with a cell/ground node 116 may be programmed into a configuration file (e.g., in a stored value or pointer) for the cell/ground node 116 using the arrangement information, which is illustrated in FIG. 7, so that overall processing by the spectrum scheduler 108 is reduced.

At 562, the spectrum scheduler 108 may determine the location of the ground node(s) 116, such as a cellular antenna of a cell tower, and/or a client device 106, as described above.

At 564, the spectrum scheduler 108 may determine frequencies or bands used by a satellite 142 serving the geographic region of the cell served by the ground node(s) 116 and/or the ground node(s) 116. In some implementations, the spectrum scheduler 108 may determine a signal received by the ground node(s) 116 from the satellite 142, which identifies the band used by the satellite 142. In some implementations, the spectrum scheduler 108 may retrieve data from a database 128, which stores a table outlining satellite 142 attributes, satellite 142 locations, bands used by satellites 142, bands used by a non-terrestrial network in a certain geographic region, and/or non-terrestrial bands associated with a cell/ground node 116, as noted above. For instance, based on the identified location of the cell, the spectrum scheduler 108 may retrieve data from the database 128 identifying the band used by the non-terrestrial network in that location, although other implementations are possible.

At 566, the spectrum scheduler 108 may determine a scaling ratio and/or blanking frequency ranges based on the frequency spectrum used by the satellite 142. For instance, similar to the implementations described in reference to block 540, may use the identified frequency(ies) or bands to adjust the blanking ranges.

For example, in a similar way to that described in reference to FIG. 5B, the spectrum scheduler 108 may increase blanking range sizes or locations, for example, to maintain a certain frequency offset from the spectrum bands/blocks used in a defined geographic region by a non-terrestrial network or satellite 142. This factor (e.g., position in the spectrum of band used by a satellite 142) may be used separately or in combination with the factors described above, such as signal quality indicator, elevation angle, distance to satellite 142, etc., to determine assignable frequency ranges and/or blanking ranges.

For instance, an initial set of blanking ranges may be determined for groupings of signal quality indicator values. This initial set of blanking ranges may be used across cells/ground nodes 116 in a terrestrial cell network. The initial set of blanking ranges may then be adjusted for specific cells based on other factors, such as elevation angle, distance to a satellite 142, bands used by satellites 142 for the geographic region of the cell and/or ground node 116, and/or other factors. In some implementations, the spectrum scheduler 108 may determine the initial set of blanking ranges and then modify the blanking ranges based on satellite 142 elevation angle, as described in reference to FIG. 5B. In some implementations, the spectrum scheduler 108 may also or alternatively modify the blanking ranges based on the band(s) used by the satellite 142 in the geographic region corresponding to the cell/cell tower. The various factors affecting assignable or blanking ranges may act together or against each other constructively or destructively and may have varying levels of impact on the sizes of the ranges. The relative weights of each of the factors may be defined by an administrator or determined by the spectrum scheduler 108, for example, using measurements of the interference applied to train the weights in a machine learning model.

As noted elsewhere herein, these computations may be performed periodically, in response to a change in a terrestrial or non-terrestrial network, or continuously/in real or near real time. For instance, upon receiving a trigger to update blanking ranges, the spectrum scheduler 108 may update the blanking ranges for one or more cells/ground nodes 116. The spectrum scheduler 108 may then then determine a signal quality indicator value for an identified client device 106, place the client device 106 into one of the pre-determined buckets (e.g., low, mid, or high-signal quality indicator value with associated determined blanking ranges), and assign channels to the client device 106 subject to flexibility defined by the assignable ranges or blanking ranges, as described throughout this disclosure.

FIGS. 8A and 8B illustrate a simplified diagrams 800a and 800b, respectfully, of a wireless spectrum(s) used by wireless client devices 106, such as mobile phones with cellular radios. The wireless spectrum(s) illustrated in diagrams 800a and 800b may correspond to those of FIGS. 3, 6A, and 6B, although they may be different, depending on the implementation.

As illustrated in FIG. 8A, a satellite 142 for a cell/ground node 116 (e.g., for a region in which the cell is located) may use a high band (e.g., as indicated by the patterned block/band) in the spectrum. Accordingly, the spectrum scheduler 108 may increase the sizes of assignable spectrum ranges and decrease the sizes of blanking ranges, so that there are more channels/frequencies that may be assigned to a client device 106. For instance, assignable ranges 802a, 802b, 802c, and corresponding blanking ranges 804a, 804b, and 804c.

As illustrated in FIG. 8B, a satellite 142 for a cell/ground node 116 may use a low band (e.g., as indicated by the patterned block/band) in the spectrum. Accordingly, the spectrum scheduler 108 may decrease the sizes (e.g., threshold frequencies) of assignable spectrum ranges and increase the sizes of blanking ranges, so that there are fewer channels/frequencies that may be assigned to a client device 106, which may also reduce interference for these cells. For instance, FIG. 8B illustrates a first assignable frequency range 822a and corresponding first blanking range 824a for devices with low-level signal quality indicator values, a second assignable frequency range 822b and corresponding second blanking range 824b for devices with mid-level signal quality indicator values, a third assignable frequency range 822c and corresponding third blanking range 824c for devices with high-level signal quality indicator values. As illustrated, where the band used by a satellite is lower, the thresholds at which frequencies/channels may be assigned to client devices 106 may also be lower to reduce interference.

It should be noted that, because more frequencies/channels are available to a terrestrial network when a high band is used by a satellite 142 (e.g., thereby increasing assignable frequency ranges), satellites 142 in high-population areas may be assigned higher bands where possible. Accordingly, a non-terrestrial network operator may rank geographic regions based on population or population density in the regions and then assign lower bands to low-density populated regions and higher frequency bands to high-density populated areas, thereby reducing impact of the non-terrestrial network using portions of the available cellular spectrum.

At 568, the spectrum scheduler 108 may determine an assignable spectrum range and/or blanking frequencies for the specific wireless client device 106, for example, as described in reference to the operations at 508 and 510.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system 100 and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi') transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats. Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   determining, by one or more processors, a signal quality indicator value for a wireless client device using one or more wireless signals;
   determining, by the one or more processors, one or more spectrum blanking ranges for the wireless client device, the one or more spectrum blanking ranges restricting wireless frequencies in the one or more spectrum blanking ranges from being assigned to the wireless client device by a ground node, wherein the determining the one or spectrum blanking ranges includes;
      determining a spectrum band used by a satellite serving a cell area of the ground node; and
      determining the one or more spectrum blanking ranges for the wireless client device based on the spectrum band used by the satellite, wherein determining the spectrum band includes determining a location of the ground node and identifying the satellite serving the cell area from among a plurality of satellites based on the location of the ground node, each of the plurality of satellites using a different spectrum band;
   determining, by the one or more processors, an assignable spectrum range for the wireless client device based on the signal quality indicator value and the one or more spectrum blanking ranges; and
   assigning, by the one or more processors, a channel to the wireless client device using the assignable spectrum range.

2. The computer-implemented method of claim 1, further comprising:
   receiving, by the one or more processors, the one or more wireless signals from the wireless client device, the one or more wireless signals identifying the wireless client device.

3. The computer-implemented method of claim 1, wherein the signal quality indicator value is determined for the wireless client device relative to one or more antennas of the ground node.

4. The computer-implemented method of claim 1, further comprising:
   determining a size of the one or more spectrum blanking ranges based on an elevation angle, wherein a lower elevation angle relative to a horizon causes the one or more processors to determine the size of the one or more spectrum blanking ranges to be larger than the one or more spectrum blanking ranges are for a relatively higher elevation angle relative to the horizon.

5. The computer-implemented method of claim 1, further comprising:
   determining a distance between the ground node and one or more satellites based on a position of the one or more satellites; and
   determining a size of the one or more spectrum blanking ranges based on the distance, wherein a longer distance causes the one or more processors to determine the size of the one or more spectrum blanking ranges to be larger than a relatively shorter distance between the ground node and the one or more satellites.

6. The computer-implemented method of claim 1, wherein:
   the plurality of satellites serve a plurality of geographic regions, each spectrum band corresponding to a geographic region of the plurality of geographic regions.

7. A system comprising:
   one or more processors; and
   one or more memories storing instructions that, when executed by the one or more processors, cause the system to:
      determine a signal quality indicator value for a wireless client device using one or more wireless signals;
      determine one or more spectrum blanking ranges for the wireless client device, the one or more spectrum blanking ranges restricting wireless frequencies in the one or more spectrum blanking ranges from being assigned to the wireless client device, wherein determining the one or more spectrum blanking ranges includes;
         determining a spectrum band used by a satellite serving a cell area associated with the wireless client device; and
         determining the one or more spectrum blanking ranges for the wireless client device based on the spectrum band used by the satellite, wherein determining the spectrum band includes determining a location of a cell tower of the cell area and identifying the satellite serving the cell area from among a plurality of satellites based on the location of the cell tower, each of the plurality of satellites using a different spectrum band;
      determine an assignable spectrum range for the wireless client device based on the signal quality indicator value and the one or more spectrum blanking ranges; and
      assign a channel to the wireless client device using the assignable spectrum range.

8. The system of claim 7, wherein the instructions, when executed by the one or more processors, further cause the system to:
   receive the one or more wireless signals from the wireless client device, the one or more wireless signals identifying the wireless client device.

9. The system of claim 7, wherein the signal quality indicator value is determined for the wireless client device relative to one or more antennas of a cell associated with the wireless client device.

10. The system of claim 7, wherein the instructions, when executed by the one or more processors, further cause the system to:
    determine a size of the one or more spectrum blanking ranges based on an elevation angle, wherein a lower elevation angle relative to a horizon causes the one or more processors to determine the size of the one or more spectrum blanking ranges to be larger than the one or more spectrum blanking ranges are for a relatively higher elevation angle relative to the horizon.

11. The system of claim 7, wherein the instructions, when executed by the one or more processors, further cause the system to:
    determine a distance between the cell area and one or more satellites based on the position of the one or more satellites; and
    determine a size of the one or more spectrum blanking ranges based on the distance, wherein a longer distance causes the one or more processors to determine the size of the one or more spectrum blanking ranges to be larger than a relatively shorter distance between the cell area and the one or more satellites.

12. A computer-implemented method comprising:
- determining, by one or more processors, a signal quality indicator value for a wireless client device using one or more wireless signals;
- determining, by the one or more processors, one or more spectrum blanking ranges for the wireless client device, the one or more spectrum blanking ranges restricting wireless frequencies in the one or more spectrum blanking ranges from being assigned to the wireless client device, determining the one or spectrum blanking ranges including:
  - determining a satellite serving a geographic region including a cell for the wireless client device;
  - determining an elevation angle of the satellite relative to the cell;
  - determining a spectrum band used by the satellite; and
  - setting the one or more spectrum blanking ranges based on the elevation angle and the spectrum band used by the satellite;
- determining, by the one or more processors, an assignable spectrum range for the wireless client device based on the signal quality indicator value and the one or more spectrum blanking ranges; and
- assigning, by the one or more processors, a channel to the wireless client device using the assignable spectrum range.

* * * * *